Jan. 17, 1967 L. M. HALLS ETAL 3,298,161
CONDITIONER ATTACHMENT
Filed Aug. 17, 1964 2 Sheets-Sheet 1
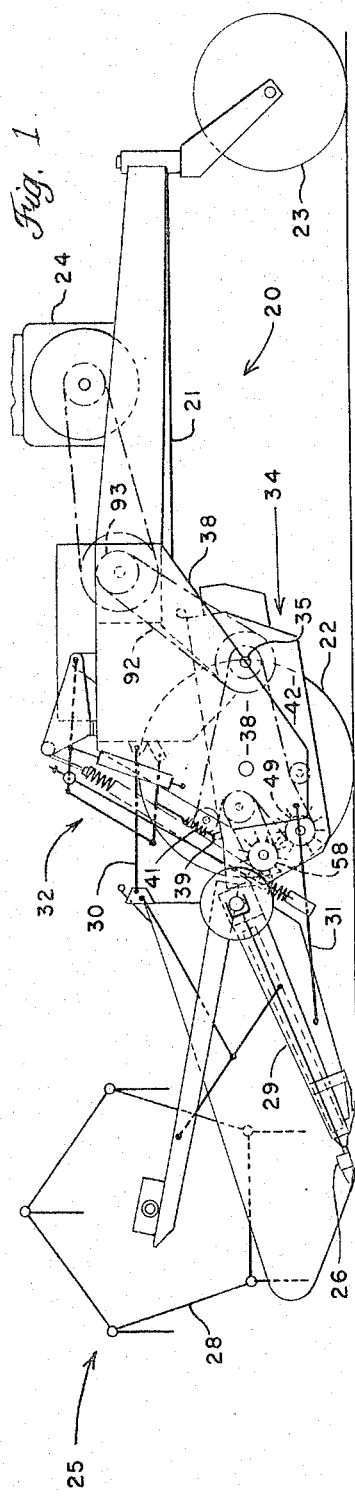
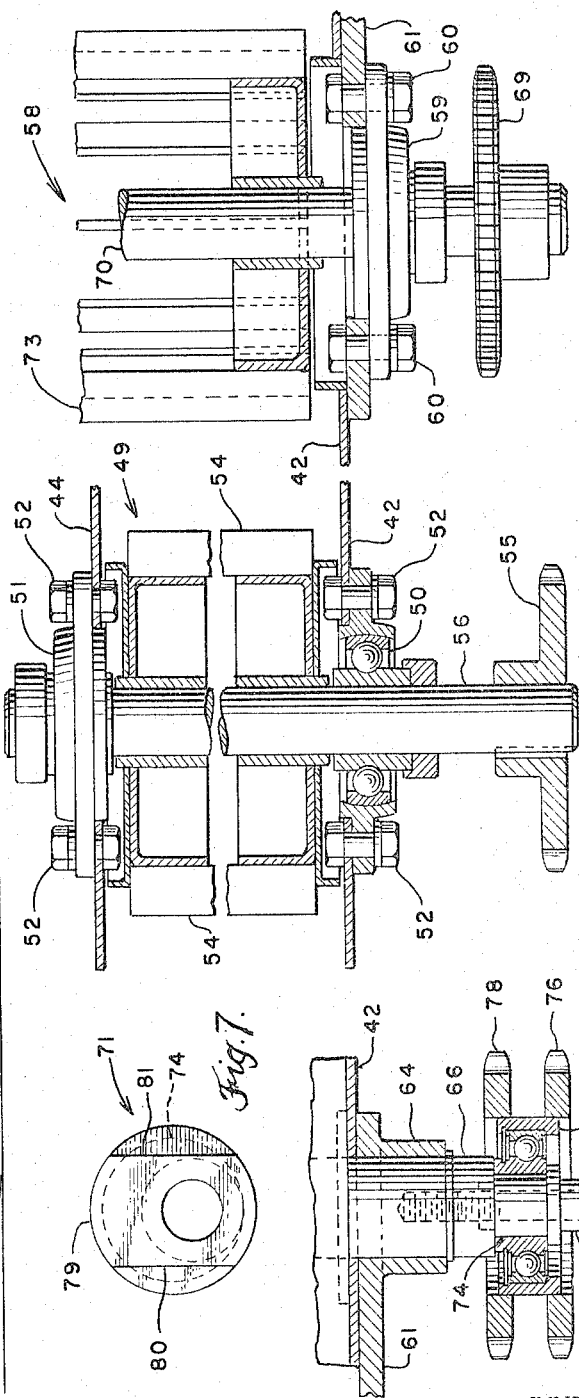
INVENTORS
LAWRENCE M. HALLS &
HORACE G. MC CARTY
BY Walter V. Wright
AGENT INVENTORS
LAWRENCE M. HALLS &
HORACE G. MC CARTY
BY Walter V. Wright
AGENT

United States Patent Office 3,298,161
Patented Jan. 17, 1967

3,298,161
CONDITIONER ATTACHMENT
Lawrence M. Halls and Horace G. McCarty, New Holland, Pa., assignors to Sperry Rand Corporation, New Holland, Pa., a corporation of Delaware
Filed Aug. 17, 1964, Ser. No. 389,980
10 Claims. (Cl. 56—1)

This invention relates to agricultural machinery of the type known as windrowers, or swathers.

There are three major components to most windrowers: a tractor unit, a header unit and a conditioner unit. The tractor unit comprises a steerable, engine driven, mobile frame. The header unit is carried by the tractor unit at the front thereof and usually includes a sickle bar to mow a wide swath of crop material and conveyor means rearwardly of the sickle bar to consolidate the swath of material into a narrow windrow which is discharged rearwardly from the header at the center thereof. The conditioner unit sometimes constitutes a part of the header although, as in the present invention, it may be a separate unit independent of the header and carried by the tractor unit rearwardly of the header. The crop conditioning function consists of either cracking or crushing the stems of the crop material between rollers to facilitate the evaporation of moisture from the soft inner core of the stems in preparation for baling or other subsequent harvesting operations.

It has been customary practice in recent years to trail a crop conditioning implement behind a conventional mower prior to the windrowing operation. In an operation such as this, a seven foot wide swath of cut hay, for example, is conditioned by a pair of seven foot long conditioner rolls. In a windrower conditioner arrangement, the sickle bar may mow a swath of hay sixteen or more feet wide. The header conveyor means consolidates the wide swath into a mat or windrow less than four feet wide. This narrow, relatively dense, windrow is then delivered to the approximately four foot long conditioner rolls of the windrower conditioner attachment. Thus, while the windrower conditioner attachment is similar in many ways to conventional crop conditioning implements, the mass and volume of the product being conditioned is quite different from that of the same product encountered by conventional conditioner implements. The windrower conditioner attachment departs from conventional conditioning implements primarily as a result of the difference in character of, and the different nature of the problems encountered as a result of, the large mass and volume of material upon which it operates. The present invention is primarily concerned with the mounting and driving of the crop conditioning rolls of a windrower conditioner attachment.

It is an object of this invention to provide a conditioner attachment for a windrower having improved mechanism for driving the conditioner rolls in timed relation to each other from power-take-off means on the windrower tractor.

It is another object of this invention to provide a conditioner attachment for a windrower having a floatingly movable conditioner roll wherein the ends of the roll are each mounted independently of the other for floating action toward and away from a fixed conditioner roll thereby enabling the floating roll to better accommodate the many types and magnitudes of adverse conditions that arise during a windrowing operation.

It is another object of this invention to provide a conditioner attachment for a windrower having a fixed conditioner roll and a movable conditioner roll and positive timed roll driving mechanism for both rolls which is unaffected by floating or tilting action of the movable roll.

It is another object of this invention to provide a conditioner attachment for a windrower having a driven floating conditioner roll which is spring biased toward a driven fixed conditioner roll in such a manner that the spring biasing force decreases in response to separation of the rolls thereby facilitating the passage therethrough of foreign objects and slugs of material while reducing the likelihood of roll damage.

It is another object of this invention to provide a conditioner attachment for a windrower having timed roll drive means which requires no compensating adjustment in response to the mounting of the conditioner attachment on, the adjustment of the conditioner attachment relative to, or the removal of the conditioner attachment from, a windrower tractor unit.

It is another object of this invention to provide a conditioner attachment for a windrower having conditioner rolls which are positively driven in timed relation to each other by endless chain driving mechanism wherein the chain tension, and therefore the timing, is easily controlled and adjusted to a fine degree.

It is another object of this invention to provide a conditioner attachment for a windrower which is rugged and dependable in operation and capable of being manufactured at relatively low cost.

These and other objects and advantages of this invention will be apparent upon reference to the following description and claims taken in conjunction with the accompanying drawings wherein:

FIG. 1 is a diagrammatic side elevational view of a windrower upon which is mounted a conditioner attachment constructed in accordance with the principles of the present invention;

FIG. 4 is an enlarged fragmentary sectional view taken on the line 4—4 of FIG. 2;

FIG. 5 is an enlarged fragmentary sectional view taken on the line 5—5 of FIG. 2;

FIG. 6 is an enlarged fragmentary sectional view taken on the line 6—6 of FIG. 2; and FIG. 7 is an end view, to an enlarged scale, of the eccentric sprocket mounting member shown in FIG. 4.

Figure 3:
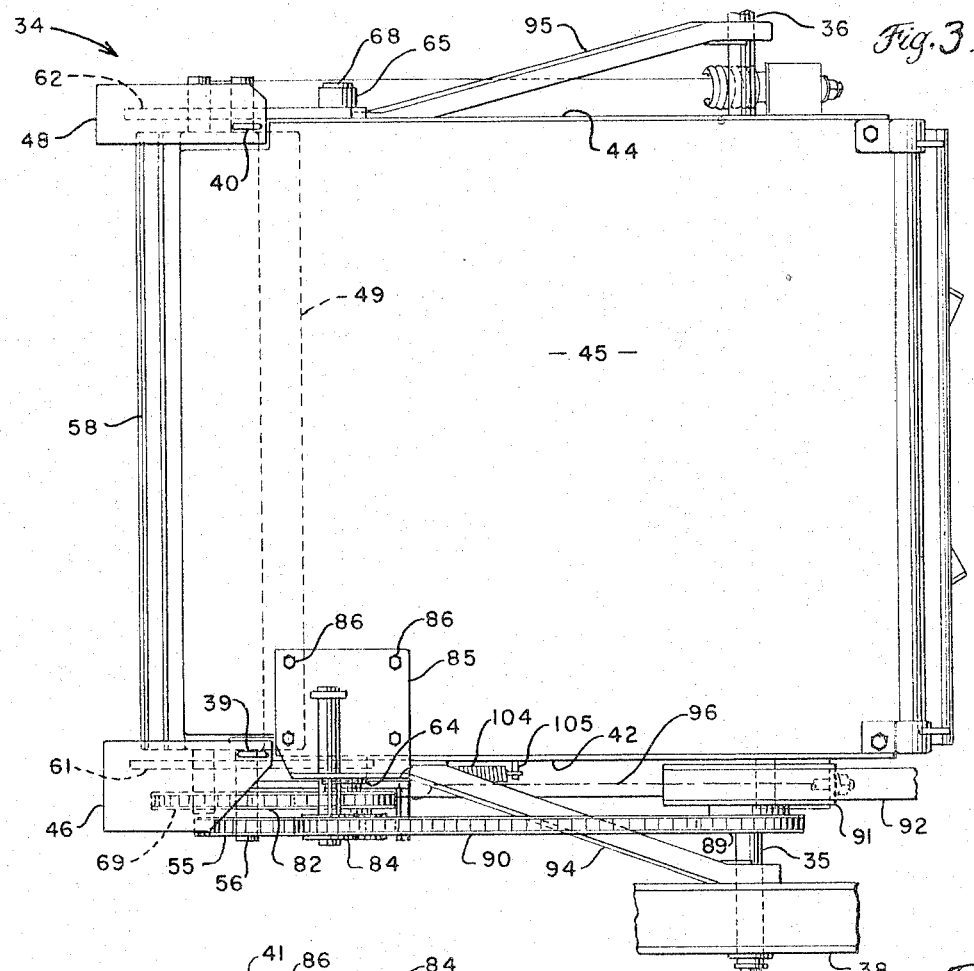
FIG. 3 is a plan view of the conditioner unit shown in FIG. 2.

Referring now to the drawings in detail, particularly FIG. 1; the reference numeral 20 indicates, generally, a windrower tractor unit having a frame 21 on which are journalled a pair of laterally spaced traction wheels 22 (one shown) at the front portion thereof and a single caster-type wheel 23 at the rear thereof. Caster wheel 23 is laterally offset to one side of the longitudinal center of the frame, as is common in the windrower art. An engine 24 is carried on frame 21 and drives traction wheels 22 by conventional drive mechanism which is not a part of the present invention and is therefore not shown in detail. A windrower header unit, indicated generally by the reference numeral 25, is disposed at the front of the tractor unit 20. The header unit 25 comprises the usual sickle bar 26, reel 28 and draper conveyor means 29. As is well known in the art, the sickle bar and reel cooperate to cut standing crops and lay the stalks rearwardly onto draper conveyor 29 which, in turn, conveys the stalks from both ends of the header inwardly toward the center of the header where they are discharged in the form of a windrow.

Header unit 25 is mounted on tractor unit 20 by a pair of laterally spaced, vertically swingable upper header links 30, one of which is visible in diagrammatic form in FIG. 1, and a similar pair of lower header links 31. Power lift linkage, indicated generally by the reference numeral 32, is connected to the lower pair of header links 31 and selectively controllable by the tractor operator to raise and lower the header unit.

A crop conditioner unit indicated generally by the reference numeral 34 is carried on the tractor frame rearwardly of header unit 25. Pivot members 35 and 36 extend laterally from the respective left and right sides of the conditioner unit near the rear thereof relative to the direction of travel of the tractor unit (see FIG. 3). The pivot members 35 and 36 are received in sockets (not shown) carried on downwardly and forwardly extending portions 38 of the main frame of the tractor unit which also serve to mount the traction wheels 22. Hanger members 39 and 40 are disposed at the respective left and right sides of the conditioner unit at the front top portion thereof as viewed in FIG. 1 (see also FIGS. 2 and 3).

Coil springs 41 are interconnected between the respective hanger members 39 and 40 and the tractor header lift linkage 32. With this suspension arrangement, the conditioner unit 34 is pivotally adjusted about pivot members 35 and 36 automatically, to maintain a proper positioning thereof relative to the header, in response to raising and lowering of the header unit by the header lift linkage. The springs 41, in addition to merely supporting the conditioner unit also fulfill a shock absorbing function.

Figure 2:
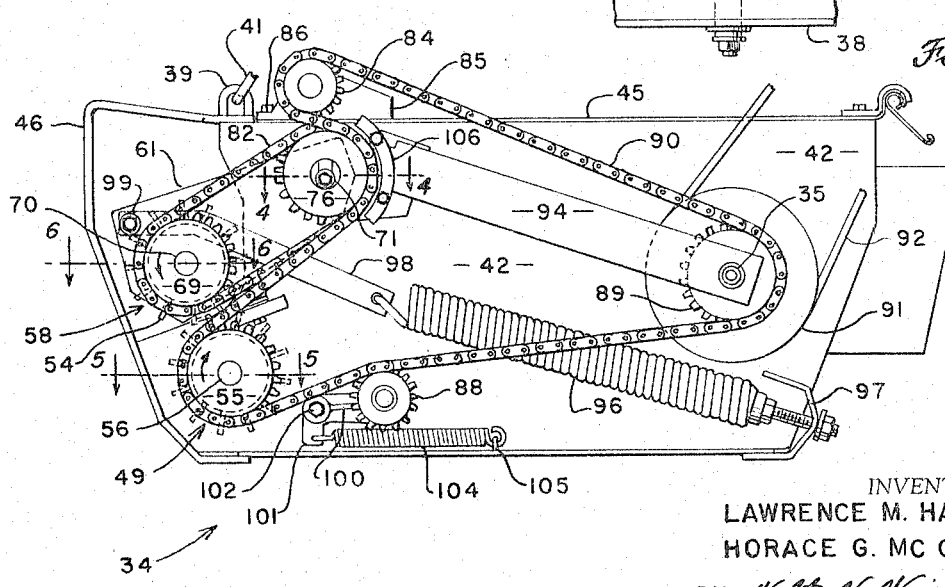
FIG. 2 is a side elevational view of the conditioner unit of the present invention.

With reference particularly to FIGS. 2 and 3 of the drawings, the conditioner unit 34 has left and right side frame plates 42 and 44 respectively and a substantially flat horizontal top plate 45. Left and right guard members 46 and 48 are carried by the respective side frame members 42 and 44 at the forwardmost edges thereof to protect the conditioner roll bearing structure and drive train. A first, or fixedly mounted, conditioner roll 49 (see FIG. 5) extends between side frame plates 42 and 44 at the lower front corner of the conditioner unit. The ends of conditioner roll 49 are journalled in bearings 50 and 51 fixedly attached by bolts 52 to the side frame plates 42 and 44. A drive sprocket 55 is keyed to the shaft 56 of roll 49 at the left end thereof, which is the end of the shaft extending through the particular side frame plate 42. Conditioner roll 49 has a crop conditioning outer periphery comprised of a series of longitudinally extending radial fins 54 which each extend the full length of the roll between the side frame plates 42 and 44.

A second, or movable, roll 58 (see FIGS. 2 and 6) has its ends journalled in bearings 59 which are fixedly attached by bolts 60 to a pair of generally fore-and-aft extending arms 61 and 62 disposed, respectively, on the outboard sides of side frame plates 42 and 44 at the front end of the conditioner unit (see FIGS. 2, 3, 4 and 6). Arms 61 and 62 are provided respectively at their rearmost ends with bearing sleeves 64 and 65 (FIG. 4) which are respectively journalled on pintles 66 and 68 fixedly carried by the respective side frame plates 42 and 44. Thus, each end of movable conditioner roll 58 is mounted for vertical swinging movement away from and back toward fixed conditioner roll 49 independently of the other end of the movable roll. Naturally, the bearings 59 are of a type which will accommodate the shaft tilting condition resulting from the raising of only one end of roll 58. A sprocket 69 is keyed to the end of the shaft 70 of second conditioner roll 58 which projects laterally from the left side of the upper conditioner roll supporting arm 61.

In the series of FIGS. 4, 5 and 6, the same scale is used throughout and the portion of the left side frame plate 42 visible in each figure is aligned with those of the remaining two figures whereby the sprockets carried by the respective shafts 56 and 70 and pintle 66 are shown in their proper planes of operation relative to each other. The second, or movable, crop conditioner roll 58 like the fixed roll 49, is provided with longitudinally extending radial crop conditioning fins 73.

An eccentric shaft-like member 71 (see FIGS. 4 and 7) is mounted, in the form of an axial extension, on the pintle 66 by a bolt 72 which extends axially through the eccentric and is received in a threaded bore coaxial with the axis of pintle 66. The eccentric 71 has a bearing surface 74 which is eccentric to the axial bore through which clamping bolt 72 extends. A conventional ball bearing 75 is seated on the bearing surface 74. A pair of rigidly fixed together coaxial sprockets 76 and 78 are carried by bearings 75. The axially outermost portion 79 of eccentric 71 is provided with diametric opposed flat surfaces 80 and 81. It will be apparent that the coaxial sprockets 76 and 78 may be adjusted eccentrically about the axis of pintle 66 by loosening clamping bolt 72. The flat surfaces 80 and 81 on the eccentric member are for purposes of receiving a wrench to facilitate adjustment of the coaxial sprockets. It may also be discerned from FIGS. 4, 5 and 6 that coaxial sprocket 76 lies in the same vertical plane as fixed conditioner roll sprocket 55 while coaxial sprocket 78 lies in the same vertical plane as the movable conditioner roll sprocket 69.

Referring now primarily to FIG. 2, it may be seen that a short endless chain 82 is entrained about the inboard sprocket 78 of the pair of coaxial sprockets and the sprocket 69 on the upper conditioner roll 58. It may be seen in the aligned FIGS. 4–6 that these sprockets lie in a vertical plane which is laterally offset from the vertical plane in which sprockets 55 and 76 are disposed. An idler sprocket 84 (FIG. 2) is disposed generally above the outer sprocket 76 of the pair of coaxial sprockets. Sprocket 84 is carried by an angle plate 85 attached by bolts 86 to the conditioner top plate 45. A spring loaded idler sprocket 88, disposed in the same vertical plane as sprockets 55, 76 and 84, is disposed near the bottom of conditioner side frame plate 42. Idler sprocket 88 is journalled at one end of the fore-and-aft extending arm 100 of a bell crank whose other arm 101 projects downwardly from the bell crank pivot mounting bolt 102 which pivotally mounts the bell crank on side frame plate 42. A coil spring 104 has one end connected to arm 101 and the other end anchored on a bracket 105 on side frame plate 42, thereby biasing idler 88 upwardly about bell crank pivot bolt 102.

A drive sprocket 89 is journalled on the particular conditioner pivot member 35 in the vertical plane of sprockets 55, 76, 84 and 88. An endless drive chain 90 is entrained about drive sprocket 89 and extends forwardly from the underside thereof to and over spring loaded idler sprocket 88 and then on forwardly to lower conditioner roll sprocket 55, around sprocket 55 and upwardly and rearwardly therefrom to outer sprocket 76 of the pair of coaxial sprockets, around sprocket 76 and fixed idler 84, and then downwardly and rearwardly back to drive sprocket 89. It should be noted that the extent of wrap of chain 90 about each of the sprockets except tension control sprocket 88 covers substantially half the periphery of the sprocket. An arcuate shoe 106 carried by side frame plate 42 (FIG. 2) "backs up" chains 90 and 82 where the wrap around coaxial sprockets 76 and 78 to prevent these chains from moving out of firm engagement with the sprocket teeth under certain extreme conditions which will be described hereafter.

A belt pulley 91 is also journalled on conditioner pivot member 35 and fixed integrally with drive sprocket 89. An endless belt 92 (see FIGS. 1 and 2) is entrained about pulley 91 and a power-take-off pulley 93 on the tractor unit. A conventional releaseable spring loaded idler pulley (not shown) engages belt 92 between pulleys 91 and 93. With this drive arrangement, if it is desired to remove the conditioner unit from the tractor unit, the endless belt 92 is removed from power-take-off pulley 93, thus requiring no adjustment or resetting of the conditioner roll drive chain timing. It can be seen in FIGS. 2 and 1 that in the normal operating position of the conditioner rolls shown in these figures the fins of the respective rolls intermesh. Thus, it is essential that these two rolls be driven in closely timed relation to prevent clashing between the fins of the respective rolls.

At the respective sides of the conditioner frame, rearwardly and outwardly extending brace members 94 and 95 are provided (FIG. 3). These members serve to strengthen conditioner pivot members 35 and 36 and also serve as centering guides to facilitate mounting the conditioner between the frame portions 38 of the tractor unit.

An elongated fore-and-aft extending coil spring 96, best seen in FIG. 2, has its rearmost end anchored in a bracket 97 at the bottom rear corner of conditioner left side frame plate 42. The forwardmost end of spring 96 is connected to the rear end of a fore-and-aft extending metal strap 98 whose forward end is pivotally bolted at 99 to the forward portion of upper conditioner roll supporting arm 61. A separate but identical arrangement is provided on the opposite side of the container unit for the other roll supporting arm 62 of the upper conditioner roll. In FIG. 2 it may be noted that the connection points of spring 96 to bracket 97 and to strap 98, and the pivotal connection at 99 between strap 98 and arm 61 all lie in substantially a straight line spaced from the bearing sleeve 64 (FIG. 4) of upper conditioner roll supporting arms 61. Thus, the force of spring 96 biases upper conditioner roll 58 downwardly toward lower conditioner roll 49, and this force is applied to arm 61 in a form of a moment whose moment arm is the perpendicular distance between strap 98 and the center of pivotal movement of arm 61, which is pintle 66. It will be apparent in FIG. 2 that as upper conditioner roll 58 is forced upwardly due to a large wad of material, a stone or other foreign object, the perpendicular distance between strap 98 and the pivot axis of arm 61 decreases. This reduction in length of the moment arm through which the biasing force of space 96 is applied to arm 61 occurs at a faster rate than the spring rate of spring 96 increases due to stretching, thereby resulting in a progressively dimensioning magnitude of the upper roll biasing moment as the upper conditioner roll rises.

In operation, belt 92 is driven by the power-take-off pulley 93 in a direction to rotate sprocket 89 clockwise as it appears in FIG. 2. Chain 90 drives sprocket 55 of the lower roll clockwise as indicated by the arrow thereon in FIG. 2 and coaxial sprockets 76 and 78 counterclockwise. Chain 82 drives upper roll sprocket 69 in the counterclockwise direction from sprocket 78 of the coaxial sprockets.

The slack, or tension, of endless chain 82 can be adjusted to a fine degree by adjustment of eccentric mounting piece 71 of coaxial sprockets 76 and 78. This adjustment does not affect drive chain 90 which is maintained in proper tension by spring loaded idler 88.

In the above disclosed windrower conditioner attachment, the manner in which the upper roll biasing moment decreases as the upper roll raises resists plugging of the conditioner rolls by allowing the upper roll to more readily climb over large wads of crop material. This feature also reduces the power requirements of the conditioner which increase substantially if the upper roll loading force is such that the rolls must chop up large wads of material to enable their passage between the rolls. Avoidance of material chopping or shredding is also desirable from the standpoint of the quality of the harvested hay.

The mounting of the respective ends of the upper conditioner roll for floating action independently of each other materially reduces the likelihood of either of the rolls becoming wrapped with crop material by enabling one end of the roll to continue its conditioning action while the other end of the roll is climbing over a dense mass of material or a foreign object. Crop stems that are not crimped by the conditioner rolls have a greater tendency to wrap about the rolls than crimped stems. Obviously, in addition to the avoiding of roll wrapping, which leads to stopping of the windrower to clear the rolls, the purposes of the conditioner is to condition all, or as much as practically possible, of the hay crop in the interest of crop quality.

The maintenance of conditioner roll timing has been a considerable problem in crop conditioners. When one of the rolls becomes wrapped with material, for example, its effective diameter increases. It then attempts to drive the other roller by peripheral contact, faster than the drive chain. On the other hand, a heavy slug of material acts to retard roll rotation. These conditions encourage the roll driving sprockets to produce slack in various reaches of the chain which leads to the sprockets "jumping" drive chain links in one direction or the other thereby disrupting roll timing. Impacts to which the conditioner rolls are subjected also tend to produce mometary drive chain slack. The conditioner roll driving arrangement of the present invention accommodates all the maneuvering that the upper roll is mounted to preform while maintaining substantially one hundred eighty degree chain wrap about each of the sprockets in the roll drive train, except tension control sprocket 88. This arrangement, in addition to transmitting positive aggressive roll driving power, insures maintenance of proper conditioner roll timing thereby avoiding clashing and damage of the fins on the conditioner rolls.

While this invention has been described in connection with a particular embodiment thereof, it will be understood that it is capable of modification, and this application is intended to cover any variations, uses, or adaptations following, in general, the principles of the invention and including such departures from the present disclosure as come within known or customary practice in the art to which the invention pertains, and as fall within the scope of the invention or the limits of the appended claims.

Having thus described our invention, what we claim is:

1. In combination with a windrower having an engine driven mobile frame and a header unit carried by said frame at the front thereof and operable to mow a wide swath of crop material, consolidate the swath into a windrow and discharge the windrow rearwardly, a conditioner attachment comprising a pair of laterally spaced side frame members, means removably attaching said side frame members to said mobile frame rearwardly of said header unit and in the path of discharge of said windrow from the header unit, a first crop conditioner roll extending transversely between and having its ends fixedly journalled on said side frame members, a pair of arms respectively disposed adjacent said pair of side frame members and each having one end disposed generally above one of the respective ends of said first crop conditioner roll, a second crop conditioner roll extending transversely between and having its ends journalled respectively on said one ends of said pair of arms, pivot means mounting the other ends of said pair of arms on said side frame members for vertical swinging movement independently of each other whereby the ends of said second conditioner roll are free to move upwardly away from and downwardly back toward said first conditioner roll independently of each other, a first sprocket fixedly mounted on said first conditioner roll at one end thereof, a second sprocket fixedly mounted on said second conditioner roll and laterally spaced from said first sprocket, a pair of rigidly interconnected coaxial sprockets, journalled on said arm pivot means, one of said coaxial sprockets being disposed in the same plane as said first sprocket and the other of said coaxial sprockets being disposed in the same plane as said second sprocket, a drive sprocket journalled on one of said side frame members and disposed in the plane of said first sprocket and said one of said coaxial sprockets, an endless drive chain entrained around said drive sprocket, said first sprocket and said one of said pair of coaxial sprockets to drive said first sprocket and thereby said first conditioner roll in one direction and said one of said pair of coaxial sprockets in the opposite direction from said drive sprocket, a second endless chain entrained around said second sprocket and said other of said pair of coaxial sprockets to drive said second conditioner roll in said opposite direction, and means connecting said drive sprocket in driven relation to said engine.

2. In combination with a windrower having an engine driven mobile frame and a header unit carried by said frame at the front thereof and operable to mow a wide swath of crop material, consolidate the swath into a windrow and discharge the windrow rearwardly, a conditioner attachment comprising a pair of laterally spaced side frame members, means removably attaching said side frame members to said mobile frame rearwardly of said header unit and in the path of discharge of said windrow from the header unit, a first crop conditioner roll extending transversely between and having its ends fixedly journalled on said side frame members, said first conditioner roll having a crop conditioning periphery comprised of a series of longitudinally extending radial fins, a pair of arms respectively disposed adjacent said pair of side frame members and each having one end disposed generally above one of the respective ends of said first crop conditioner roll, a second crop conditioner roll extending transversely between and having its ends journalled respectively on said one ends of said pair of arms, said second crop conditioner roll having a crop conditioning periphery comprised of a series of longitudinally extending radial fins, pivot means mounting the other ends of said pair of arms on said side frame members for vertical swinging movement independently of each other between a lower normal position wherein the fins of said second crop conditioner roll mesh with the fins on said first crop conditioner roll and a raised position wherein the fins of said second roll are clear of the fins on said first roll, a first sprocket fixedly mounted on said first conditioner roll at one end thereof, a second sprocket fixedly mounted on said second conditioner roll and laterally offset from said first sprocket, a pair of rigidly interconnected coaxial sprockets journalled on said arm pivot means, one of said coaxial sprockets being disposed in the same plane as said first sprocket and the other of said coaxial sprockets being disposed in the same plane as said second sprocket, a drive sprocket journalled on one of said side frame members and disposed in the plane of said first sprocket and said one of said coaxial sprockets, an endless drive chain entrained around said drive sprocket, said first sprocket and said one of said pair of coaxial sprockets to drive said first sprocket and thereby said first conditioner roll in one direction and said one of said pair of coaxial sprockets in the opposite direction from said drive sprocket, a second endless chain entrained around said second sprocket and said other of said pair of coaxial sprockets to drive said second conditioner roll in said opposite direction in timed relation to said first conditioner roll, and means connecting said drive sprocket in driven relation to said engine.

3. In combination with a windrower having an engine driven mobile frame and a header unit carried by said frame at the front thereof and operable to mow a wide swath of crop material, consolidate the swath into a windrow and discharge the windrow rearwardly, a conditioner attachment comprising a pair of laterally spaced side frame members, means removably attaching said side frame members to said mobile frame rearwardly of said header unit and in the path of discharge of said windrow from the header unit, a first crop conditioner roll extending transversely between and having its ends journalled on said side frame members, a first sprocket fixed coaxially on said first crop conditioner roll at one end thereof, a pair of arms respectively disposed adjacent said pair of side frame members, said arms each having one end disposed generally above one of the respective ends of said first crop conditioner roll, pivot members mounting the other ends of said arms respectively on said side frame members, a second crop conditioner roll extending between and having its ends journalled on said pair of arms generally above said first conditioner roll for vertical swinging movement with said arms away from and back toward said first crop conditioner roll, a second sprocket fixed coaxially on said second crop conditioner roll, said second roll sprocket lying in a vertical plane laterally spaced from said first roll sprocket, a pair of coaxial rigidly interconnected sprockets one of which is disposed in the vertical plane of said first roll sprocket and the other of which is disposed in the vertical plane of said second roll sprocket, means journalling said coaxial sprockets on said pivot member of one of said pair of arms, a first endless chain entrained about said other of said coaxial sprockets and said second roll sprocket to drive said second crop conditioner roll from said other of said coaxial sprockets, a drive sprocket journalled on one of said side frame members and disposed in the vertical plane of said first roll sprocket and said one of said coaxial sprockets, an endless drive chain entrained around said drive sprocket, said first roll sprocket and said one of said pair of coaxial sprockets in a manner to rotatably drive said first sprocket in one direction from said drive sprocket and said coaxial sprockets in the opposite direction, drive chain tension control means mounted on one of said side frame members and engaging said drive chain between said drive sprocket and said first roll sprocket, and means connecting said drive sprocket in driven relation to said engine.

4. The combination recited in claim 3 wherein said means journalling said coaxial sprockets on said pivot member of one of said pair of arms comprises an eccentric on which said pair of coaxial sprockets are rotatably carried, means mounting said eccentric on said pivot member for movement eccentrically about the axis of said pivot member, and means releasably clamping said eccentric in any desired position to which it is moved whereby the position of said coaxial sprockets relative to said second sprocket may be selectively adjusted to maintain proper operating tension of said first endless chain.

5. The combination recited in claim 3 wherein said means removably attaching said side frame members to said mobile frame comprises pivot members on said frame members attachable to said tractor unit to mount the frame members on the tractor unit for vertical pivotal adjustment about an axis transverse to the direction of tractor travel, and wherein said drive sprocket is journalled on one of said side frame pivot members coaxial with the axis of vertical pivotal adjustment of said side frame members.

6. The combination recited in claim 3 wherein said first roll sprocket is disposed forwardly of said drive sprocket and said one of said pair of coaxial sprockets is disposed above and behind said first roll sprocket, an idler sprocket journalled on one of said frame members in a fixed position above said one of said pair of coaxial sprockets, said drive chain extending forwardly from said drive sprocket to and around the forwardmost side of said first roll sprocket in meshing engagement with substantially half the circumference of said first roll sprocket then rearwardly and upwardly to said one of said pair of coaxial sprockets and around the rearmost side of said one of said pair of coaxial sprockets in meshing engagement with substantially half the circumference thereof then upwardly and forwardly to and around said fixed idler sprocket and back to said drive sprocket.

7. The combination recited in claim 3 wherein an arcuate chain guard member is fixedly attached to one of said side frame members and disposed generally concentrically with said pair of coaxial sprockets on the side thereof about which said first endless chain and said endless drive chain are wrapped, thereby preventing said endless chains for moving out of firm engagement with said coaxial sprockets even upon the formation of abnormally large amounts of slack in said endless chains.

8. In combination with a windrower having an engine driven mobile frame and a header unit carried by said frame at the front thereof and operable to mow a wide swath of crop material, consolidate the swath into a windrow and discharge the windrower rearwardly, a conditioner attachment comprising a pair of laterally spaced side frame members, means removably attaching said side frame members to said mobile frame rearwardly of said header unit and in the path of discharge of said windrow from the header unit, a first crop conditioner roll extending transversely between and having its ends journalled in said side frame members, a first sprocket fixed coaxially on said first crop conditioner roll at one end thereof, a pair of arms respectively disposed adjacent said pair of side frame members, said pair of arms having forward ends disposed generally above the ends of said first crop conditioner roll and rear ends disposed above and behind their respective forward ends, pivot members mounting the rear ends of said arms respectively on said side frame members for vertical swinging movement independently of each other, a second crop conditioner roll extending between and having its ends journalled on said pair of arms at the forward ends thereof for vertical swinging movement with said arms between a lower conditioning position close to said first conditioning roll and a raised conditioning position farther away from said first conditioner roll, an elongated generally fore-and-aft extending coil spring, means connecting the rear end of said spring to one of said side frame members, means connecting the forward end of said coil spring to one of said arms at a point spaced from said arm pivot member and providing a moment arm through which the force of said spring is applied to said one of said arms, said arm pivot member and said spring connecting means being so relatively located that upward vertical swinging of said one of said arms decreases said moment arm thereby reducing the biasing force exerted on said arm by said spring, a second sprocket fixed coaxially on said second crop conditioner roll, said second roll sprocket lying in a vertical plane laterally spaced from said first roll sprocket, a pair of coaxial rigidly inter-connected sprockets one of which is disposed in the plane of said first roll sprocket and other of which is disposed in the plane of said second roll sprocket, means journalling said coaxial sprockets on said pivot member of one of said pair of arms, a first endless chain entrained about said other of said coaxial sprockets and said second roll sprocket to drive said second crop conditioner roll from said other of said coaxial sprockets, a drive sprocket journalled on one of said side frame members and disposed in the plane of said first roll sprocket and said one of said coaxial sprockets, an endless drive chain entrained about said drive sprocket, said first roll sprocket and said one of said pair of coaxial sprockets in a manner to drive said first roll sprocket in the direction of rotation of said drive sprocket and said coaxial sprockets in the opposite direction thereby driving said conditioner rolls in opposite directions in timed relation to each other, drive chain tension control means mounted on one of said side frame members and engaging said drive chain between said drive sprocket and said first roll sprocket, and means connecting said drive sprocket in driven relation to said engine.

9. In combination with a windrower having an engine driven mobile frame and a header unit carried by said frame at the front thereof and operable to mow a wide swath of crop material, consolidate the swath into a windrower and discharge the windrower rearwardly, a conditioner attachment comprising a pair of laterally spaced side frame members, means removably attaching said side frame members to said mobile frame rearwardly of said header unit and in the path of discharge of said windrow from the header unit, a first crop conditioner roll extending transversely between and having its ends fixedly journalled on said side frame members, said first conditioner roll having a crop conditioning periphery comprised of a series of longitudinally extending radial fins, a second crop conditioner roll having a crop conditioning periphery comprised of a series of longitudinally extending radial fins disposed generally above and parallel to said first crop conditioning roll, means mounting the ends of said second crop conditioner roll respectively on said side frame members for vertical movement independently of each other between a normal position wherein the fins of said second roll mesh with fins of said first roll and a raised position wherein the fins of said second roll are clear of the fins of said first roll, idler sprocket means carried by said second roll mounting means, a drive sprocket journalled on one of said side frame members, means connecting said drive sprocket in driven relation to said engine, an endless chain driving said first conditioner roll and said idler sprocket means in opposite directions in timed relation to each other from said drive sprocket, and a separate endless chain driving said second conditioner roll from said idler sprocket means.

10. In combination with a windrower having an engine driven mobile frame and a header unit carried by said frame at the front thereof and operable to mow a wide swath of crop material, consolidate the swath into a windrower and discharge the windrow rearwardly, a conditioner attachment comprising a pair of laterally spaced side frame members, means removably attaching said side frame members to said mobile frame rearwardly of said header unit and in the path of discharge of said windrow from the header unit, a first crop conditioner roll extending transversely between and having its ends fixedly journalled on said side frame members, said first conditioner roll having a crop conditioning periphery comprised of a series of longitudinally extending radial fins, a second crop conditioner roll having a crop conditioning periphery comprised of a series of longitudinally extending radial fins disposed generally above and parallel to said first crop conditioner roll, means mounting the end of said second crop conditioner roll respectively on said side frame members for vertical pivotal movement about an axis parallel to said conditioner rolls between a normal position wherein the fins of said second roll mesh with the fins of said first roll and a raised position wherein the fins of said second roll are clear of the fins of said first roll, an elongated generally fore-and-aft extending coil spring, means connecting the rear end of said coil spring to one of said side frame members, means connecting the forward end of said coil spring to said second roll mounting means at a point spaced from said pivot axis and providing a moment arm through which the force of said spring is applied to said mounting means to bias said second roll toward said first roll, said pivot axis and said spring connecting means being so relatively located that upward vertical swinging of said second conditioner roll decreases said moment arm thereby reducing the biasing force exerted on said second roll by said spring, idler sprocket means carried by said second roll mounting means, a drive sprocket journalled on one of said side frame members, means connecting said drive sprocket in driven relation to said engine, an endless drive chain driving said first conditioner roll and said idler sprocket means in opposite directions in timed relation to each other from said drive sprocket, and a separate endless chain driving said second conditioner roll from said idler sprocket means.

References Cited by the Examiner

UNITED STATES PATENTS

| | | | |
|---|---|---|---|
| 2,989,829 | 6/1961 | Heth et al. | 56—1 |
| 3,006,124 | 10/1961 | Glass et al. | 56—1 |

ABRAHAM G. STONE, *Primary Examiner.*

ANTONIO F. GUIDA, *Examiner.*